United States Patent
Poole

(10) Patent No.: US 7,029,037 B2
(45) Date of Patent: Apr. 18, 2006

(54) APPARATUS FOR CONNECTING AND SEALING DUCT SECTIONS

(75) Inventor: Mark E Poole, Coeur d' Alene, ID (US)

(73) Assignee: Stamped Fittings, Inc., Elmira, NY (US)

( * ) Notice: Subject to any disclaimer, the term of this patent is extended or adjusted under 35 U.S.C. 154(b) by 527 days.

(21) Appl. No.: 09/818,470

(22) Filed: Mar. 28, 2001

(65) Prior Publication Data

US 2002/0140231 A1 Oct. 3, 2002

(51) Int. Cl.
F16L 17/00 (2006.01)

(52) U.S. Cl. .................. 285/368; 285/424; 285/405; 285/363

(58) Field of Classification Search ............... 285/363, 285/368, 424, 405
See application file for complete search history.

(56) References Cited

U.S. PATENT DOCUMENTS

| | | | |
|---|---|---|---|
| 2,451,941 A * | 10/1948 | Glover, Jr. et al. | 285/106 |
| 2,635,931 A | 4/1953 | May | |
| 3,027,179 A | 3/1962 | Wiltse | |
| 3,198,561 A * | 8/1965 | Witt | 285/364 |
| 3,322,444 A * | 5/1967 | Sewell et al. | 285/352 |
| 4,133,566 A * | 1/1979 | Miller | 285/350 |
| 4,407,534 A * | 10/1983 | Petz | 285/424 |
| 4,466,641 A | 8/1984 | Heilman | |
| 4,516,797 A * | 5/1985 | Meinig | 285/424 |
| 4,579,375 A | 4/1986 | Fischer | |
| 4,913,472 A * | 4/1990 | Janakirama-Rao | 285/336 |
| 5,016,925 A * | 5/1991 | Davis | 285/363 |
| 5,135,270 A | 8/1992 | Arnoldt | |
| 5,358,013 A * | 10/1994 | McClain | 138/109 |
| 5,378,028 A | 1/1995 | Issagholian-Havai | |
| 5,462,089 A * | 10/1995 | McClain | 285/406 |
| 5,926,937 A | 7/1999 | Goodhue | |
| 5,983,496 A * | 11/1999 | Hermanson | 29/890.15 |
| 6,289,706 B1 * | 9/2001 | Hermanson | 72/82 |
| 6,412,519 B1 * | 7/2002 | Goodhue | 138/109 |
| 2002/0125722 A1 * | 9/2002 | Pakker | 285/424 |

FOREIGN PATENT DOCUMENTS

| GB | 069062 | 4/1953 |
| GB | 0824986 | 12/1959 |

* cited by examiner

Primary Examiner—Aaron Dunwoody
(74) Attorney, Agent, or Firm—Thomas T. Aquilla

(57) ABSTRACT

An apparatus (10) for connecting and sealing duct sections is adapted for connecting and sealing round ducts (100), round oval ducts (200), and other commonly used ducts. The apparatus includes first and second connectors. Each connector includes a tubular member (20) having an outside diameter that is incrementally smaller than the inside diameter of the duct to which it is attached. An O-ring (40) carried in an O-ring channel defined in the tubular member makes an air-tight seal with the duct. A radially directed annular flange (50) extends outwardly from an outer end of the tubular member. An outer perimeter of the flange forms a rolled edge (60). A gasket (70) may be carried between the outer surfaces of adjacent flanges of first and second connectors associated with first and second ducts to be joined. Duct sealer (80) may also be carried between the outer surfaces, with or without a gasket. A plurality of fasteners (90) may be used to fasten the flanges together. An excess duct sealer containment trough (65) is defined between the first and second connectors, and receives excess duct sealer when the fasteners are tightened, thereby preventing the fouling of the perimeter of the radially directed annular flange.

8 Claims, 4 Drawing Sheets

APPARATUS FOR CONNECTING AND SEALING DUCT SECTIONS

CROSS-REFERENCES

There are no applications related to this application filed in this or any foreign country.

BACKGROUND

An apparatus to connect and seal two duct sections is well known. Such an apparatus comprises first and second connectors, one connector attached to each duct section. A flange extends from each connector, and the flanges of the two connectors are fastened together, thereby making the connection. More particularly, each connector includes a tubular member having an inside diameter incrementally less (or greater) than an inside (or outside) diameter of a round or round oval duct. A radially directed annular flange extends from the tubular member. The flanges of the first and second connectors are typically secured together by a plurality of fasteners, such as sheet metal screws, distributed evenly about the flange. A washer or gasket may be carried between the flanges, to improve the seal.

The use of such a structure for connecting and sealing two duct sections is very widespread. Unfortunately, the performance of such an apparatus suffers from several problems. First, there is a tendency for the tubular member of the connecting and sealing connector to bend, and therefore to improperly fit the duct to which is it to be installed. Secondly, the flange directed outward in a radial direction may also bend, and therefore not properly fit flush against the flange of the other connector, or against the gasket carried between the flanges. Third, the outer edges of the flanges are often sharp, and care must be taken during handling to avoid injury to the installation technician and to avoid damage to other objects.

In some applications where duct sealer is used, excess duct sealer is squeezed from between the flanges as the fasteners are tightened, and tends to foul the perimeter of the apparatus.

For the foregoing reasons, there is a need for an apparatus for connecting and sealing adjacent duct sections that can overcome the disadvantages of the prior art. The apparatus for connecting and sealing two adjacent duct sections must resist deformation of both the tubular member and also the flange directed outward in a radial direction. The structure must provide for the maintenance of a gas-tight seal both between adjacent flanges, and also between the tubular member and the duct to which it is connected. The flanges must be adapted for use with conventional gaskets and duct sealers, but should additionally provide structures which result an additional barrier to gas transfer into or out of the connected ducts. The flanges must also be adapted for optional installation of additional hardware to increase the resistance of the flange to bending, for use in applications where bending is more likely to result. Additionally, some structure may be provided that contains excess duct sealer squeezed from between the flanges when the fasteners are tightened, to prevent fouling of the perimeter of the apparatus.

SUMMARY

An apparatus 10 for connecting and sealing duct sections is disclosed, and is adapted for use with both round ducts 100, round oval ducts 200, as well as other commonly used ducts. A preferred version of the apparatus 10 for connecting and sealing duct sections comprises identical first and second connectors 11, 12, associated with the first and second ducts to be connected, each connector including some or all of the following structures.

(A) A tubular member 20 has a cross-section corresponding to, and an outside diameter incrementally less than, the inside diameter of the duct to which it is to be attached. In a preferred embodiment, an O-ring channel 24 is defined in the tubular member, allowing an O-ring 40 to be carried between the tubular member and the inside surface of the duct.

(B) A flange 50 extends outward in a radial direction from an outer end 25 of the tubular member 20. The flange and the tubular member are joined by a radially inner bend 51. The flange defines inner and outer annular surfaces 52, 53.

(C) A radially outer portion of the flange forms a rolled edge 60. The rolled edge results in a rounded perimeter 63 that will not cut or injure the installer, and increases the strength and rigidity of the flange. As a result of the added strength, the outer annular surfaces 53 of adjacent flanges may be positioned flush against each other without dents, bends or warps resulting in space between the surfaces 53. A tube cavity 64, defined within the rolled edge, allows for the option installation of a wire 66, which results in still further stiffening of the rolled edge and annular flange.

(D) In use, the apparatus 10 includes first and second connectors 11, 12 attached to the ends of first and second duct sections to be connected. To make this connection, the outer surfaces 53 of two adjacent annular flanges 50 are positioned against each other. A plurality of fasteners 90, such as bolt/nut pairs or sheet metal screws, pass through holes defined in the flanges and connects the flanges 50 together.

(E) In some applications, a gasket 70 is positioned between the outer annular surfaces 53.

(F) In other applications, duct sealer 80 may be used instead of, or in addition to, the gasket. A preferred duct sealer is a caulk-like material, and is placed between the outer annular surfaces 53 of the flanges prior to the attachment of the fasteners.

(G) As the fasteners are tightened, excess duct sealer may be squeezed from between the flanges when the two outer annular surfaces 53 of the two respective connectors 11, 12 are pressed together. In this circumstance, an excess duct sealer trough 65, defined between the rolled edges 60 of two adjacent connectors, provides a location to which excess duct sealer is discharged. As a result, duct sealer does not foul the round perimeter 63.

It is therefore a primary advantage of the present invention to provide a novel apparatus for connecting and sealing duct sections wherein a rolled edge defined on the outer edge of a radially directed flange which results in a rigid flange having a planar surface which is not easily deformed, and which results in a rounded perimeter which is unlikely to cut or injure.

Another advantage of the present invention is to provide a novel apparatus for connecting and sealing duct sections which includes a radially directed annular flange having a rolled edge defining a tube cavity which is adapted to carry a wire rod, which results in additional reinforcement of the flange.

A still further advantage of the present invention is to provide a novel apparatus for connecting and sealing duct sections, whereby when the outer annular surface of the radially directed annular flange of each of first and second connector are brought into contact, an excess duct sealer containment trough is formed; and whereby when fasteners are attached to connect the annular flanges, the excess duct sealer carried between the annular flanges is transferred to the excess duct sealer containment trough in a manner that prevents the rounded perimeter from becoming fouled with duct sealer.

Other objectives, advantages and novel features of the invention will become apparent to those skilled in the art upon examination of the specification and the accompanying drawings.

DRAWINGS

These and other features, aspects, and advantages of the present invention will become better understood with regard to the following description, appended claims, and accompanying drawings where:

Figure 6A:
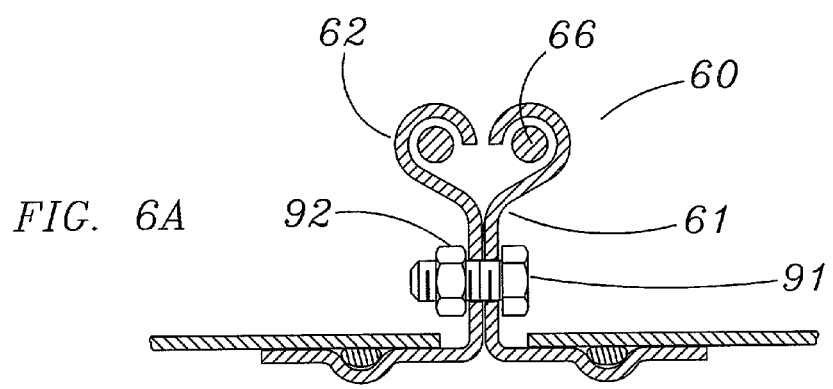

FIG. 6A is a cross-sectional view illustrating a first version of the invention, wherein first and second connectors for connecting and sealing duct sections are attached to first and second duct sections; illustrating a bolt and nut fastener securing together the two connectors; illustrating a wire rod installed in the tube cavity of the rolled edge of each connectors; and illustrating the use of an O-ring carried with an O-ring channel defined in tubular member.

Figure 6B:
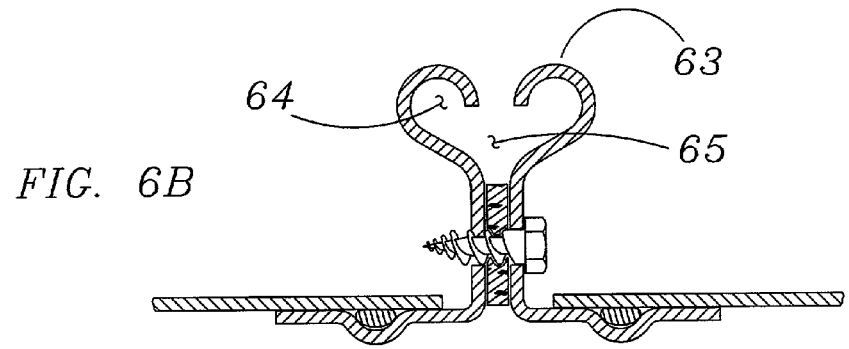

FIG. 6B is a cross-sectional view illustrating a second version of the invention, similar to that of FIG. 6A, but wherein no wire rod is present, and wherein a gasket is carried between the first and second flanges of the first and second connectors, and wherein a sheet metal screw is used as the fastener.

Figure 6C:
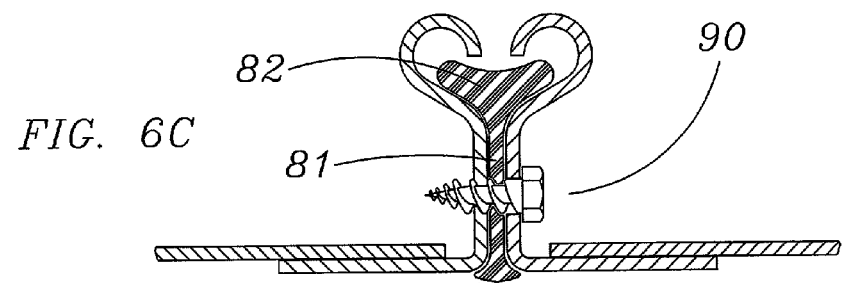

FIG. 6C is a cross-sectional view illustrating a third version of the invention, similar to that of FIG. 6B, but wherein duct sealer is carried between the first and second flanges of the first and second connectors.

Figure 6D:
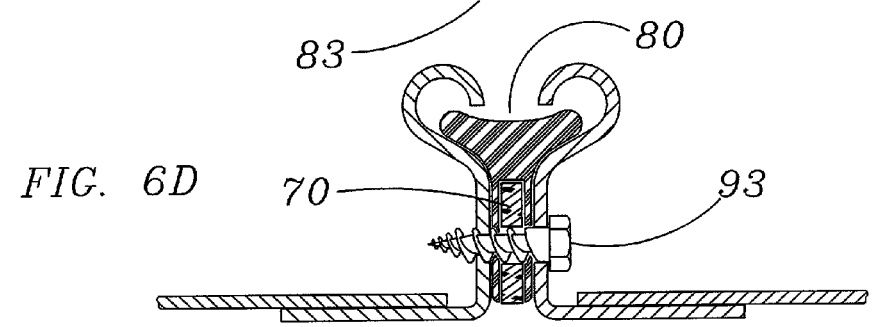

FIG. 6D is a cross-sectional view illustrating a third version of the invention, similar to that of FIG. 6C, but wherein duct sealer and a gasket are carried between the first and second flanges of the first and second connectors.

Figure 6E:
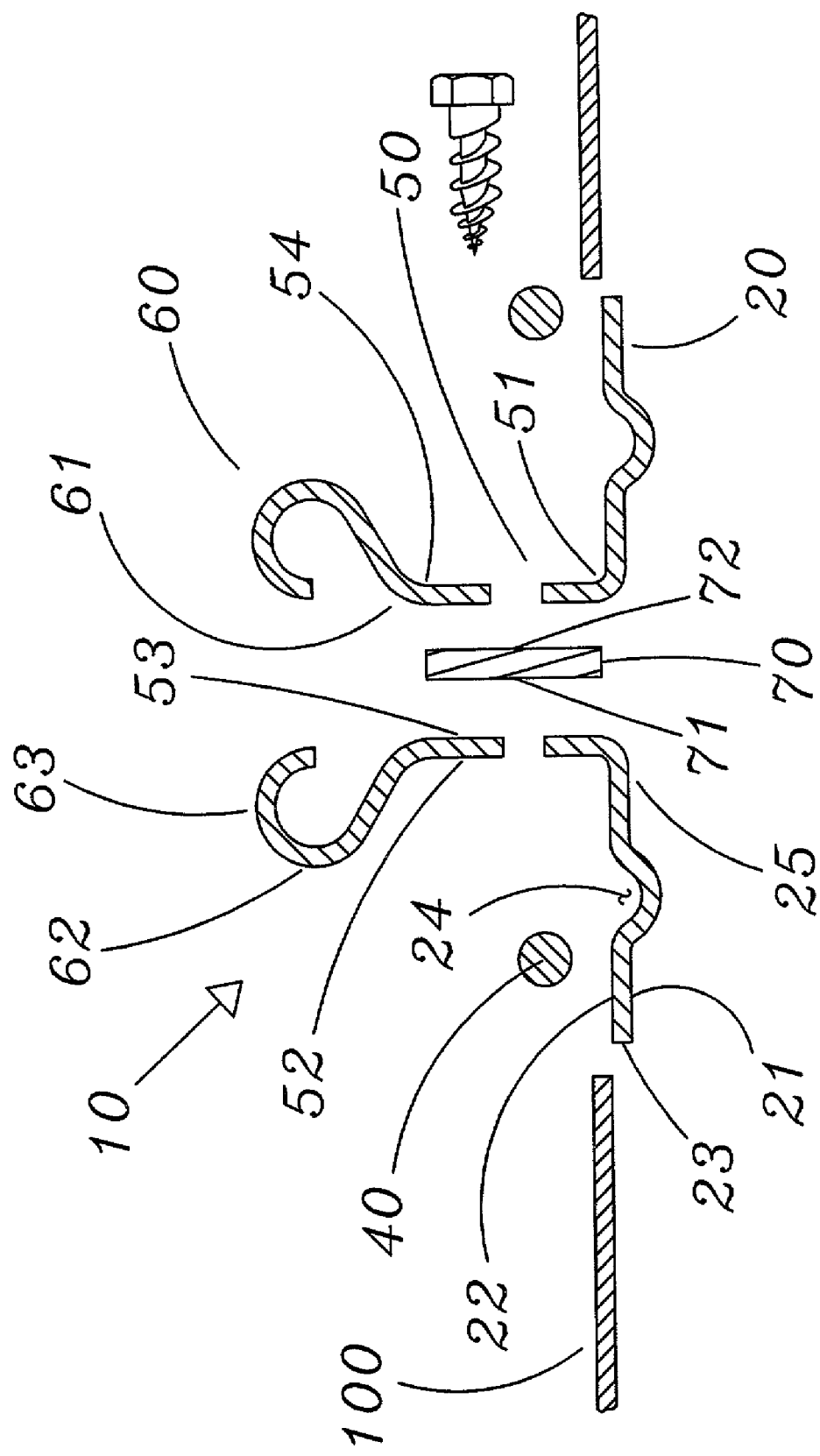

FIG. 6E is an exploded view of FIG. 6B, to better illustrate and label the components.

DESCRIPTION

Referring in generally to FIGS. 1 through 6, an apparatus 10 for connecting and sealing duct sections constructed in accordance with the principles of the invention is seen. The apparatus 10 includes identical first and second connectors 11, 12, attached to first and second HVAC (heating, ventilation, air-conditioning) ducts, respectively. The apparatus 10 is adapted for connecting and sealing round ducts 100, round oval ducts 200, and other commonly used ducts. In use, the two connectors are fastened together, forming a seal between the ducts. A tubular member 20 of each connector has an outside diameter that is incrementally smaller than the inside diameter of the duct to which it is attached. An O-ring 40, carried in an O-ring channel 24 defined in the tubular member, makes an airtight seal with the duct. A radially directed annular flange 50 extends outwardly from an outer end of the tubular member. An outer perimeter of the flange forms a rolled edge 60. A gasket 70 may be carried between the outer annular surfaces of adjacent flanges of first and second connectors associated with first and second ducts to be joined. Duct sealer 80 may also be carried between the outer surfaces, with or without a gasket. A plurality of fasteners 90, such as bolts or screws, may be used to fasten the flanges together.

In an application wherein the apparatus 10 is used to connect and seal two round oval ducts 200, each having rounded sides 201 and straight sides 202, each connector comprises two half round sections 15 separated by two straight sections 16.

A tubular member 20 has a cross-section corresponding to, and an outside diameter incrementally less than, the inside diameter of the duct to which it is to be attached. The tubular member may be round, round oval, or other shape, as required to fit the ducts to be joined.

In a preferred embodiment, a concave O-ring channel 24 is defined in the outer surface 22 of the tubular member. As seen in FIGS. 6A and 6B, an O-ring 40 is carried within the O-ring channel 24, between the tubular member and the inside surface of the duct. The O-ring tends to prevent the passage of air, and results in an airtight seal. An inner surface 21 is opposite the duct to which the tubular member is attached, and defines an annular convex rib opposite the O-ring channel. An annular rim 23 is adjacent to both the inner surface 21 and outer surface 22.

In FIGS. 6C and 6D, a more economically constructed version of the invention includes a tubular member 20 having no O-ring or O-ring channel.

An annular flange 50 extends radially outwardly from an outer end 25 of the tubular member 20. The flange and the tubular member are joined by a radially inner bend 51. The flange defines inner and outer annular surfaces 52, 53.

As will be seen in greater detail, first and second adjacent flanges 50, associated with first and second connectors 11, 12, are connected by fasteners 90 in a manner wherein the outer annular surfaces 53 are adjacent.

Figure 5:
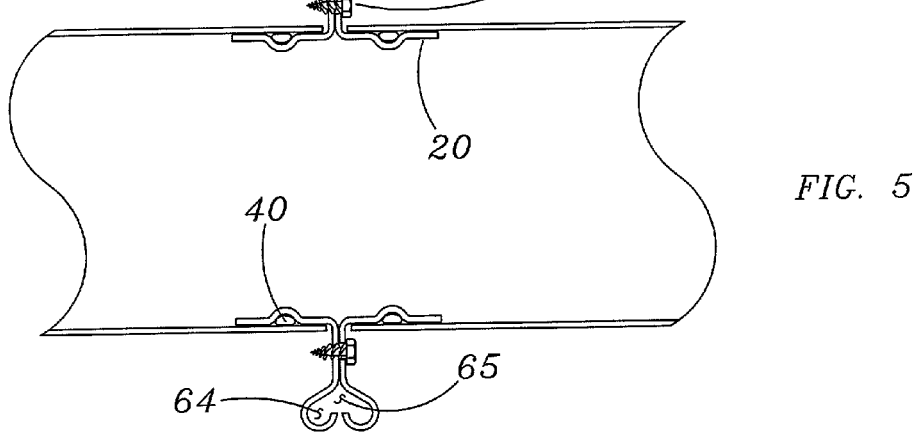
FIG. 5 is a thin-sectional view of the version of the apparatus for connecting and sealing duct sections taken along the 5—5 lines of FIG. 4.

A radially outer portion of the flange 50 forms a rolled edge 60, and is best illustrated in FIGS. 5 and 6. The rolled edge results in a rounded perimeter 63, having no sharp edges that will cut or injure the installer. The rolled edge additionally increases the strength and rigidity of the flange. As a result of the added strength, the outer annular surfaces 53 of adjacent flanges may be positioned flush against each other without dents, bends or warps resulting in non-uniform spaces between the surfaces 52.

The rolled edge 60 departs from the outer perimeter 54 of the radially directed flange 50 at a radially inner bend 61. A radially outer roll 62 extends from the inner bend. A rounded perimeter 63 extends from the radially outer roll. A tube cavity 64 is defined within the rolled edge 60

In most applications, the rolled edge results in sufficient rigidity of the flange 50, and further stiffening is unnecessary. However, in some applications, a more rigid apparatus is required. This can be true where the diameter of the apparatus is larger, and there is greater tendency for deformation. In such applications, installation of a wire rod 66, results in still further stiffening of the rolled edge. A typical wire rod installation is seen in FIG. 6A. The diameter of the wire rod is typically selected to be incrementally less than the inside diameter of the tube cavity. Such a diameter results in the greatest protection against the deformation of the rolled edge in particular, and the entire apparatus in general.

In use, the apparatus 10 includes first and second connectors 11, 12 attached to the ends of first and second duct sections to be connected. The connectors 11, 12 are then attached, thereby making the connection between the first and second duct sections.

Figure 1:
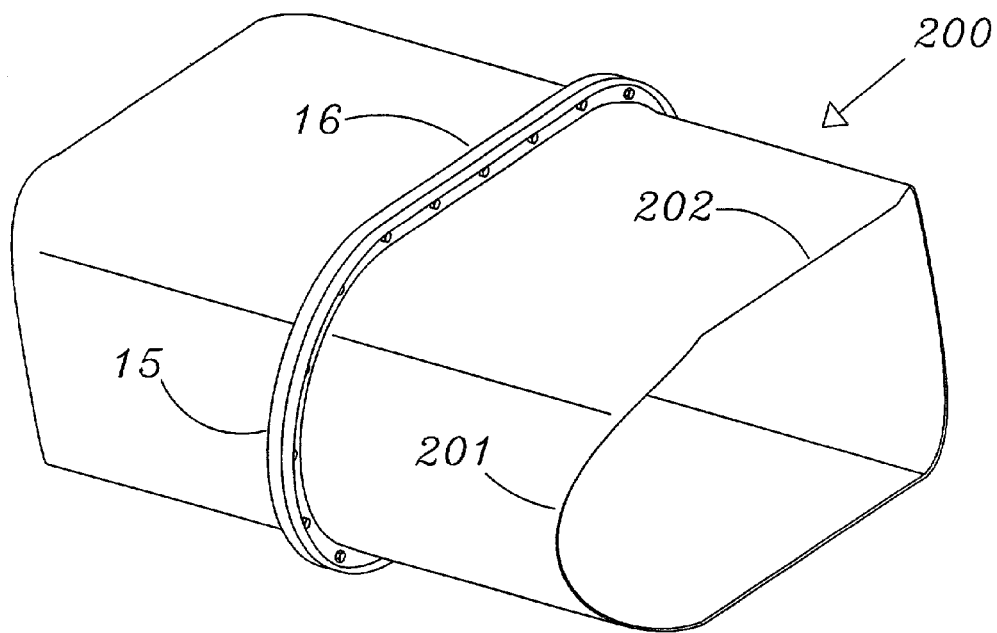
FIG. 1 is a perspective view of a first version of the apparatus for connecting and sealing duct sections adapted for use with a round oval duct.
Figure 2:
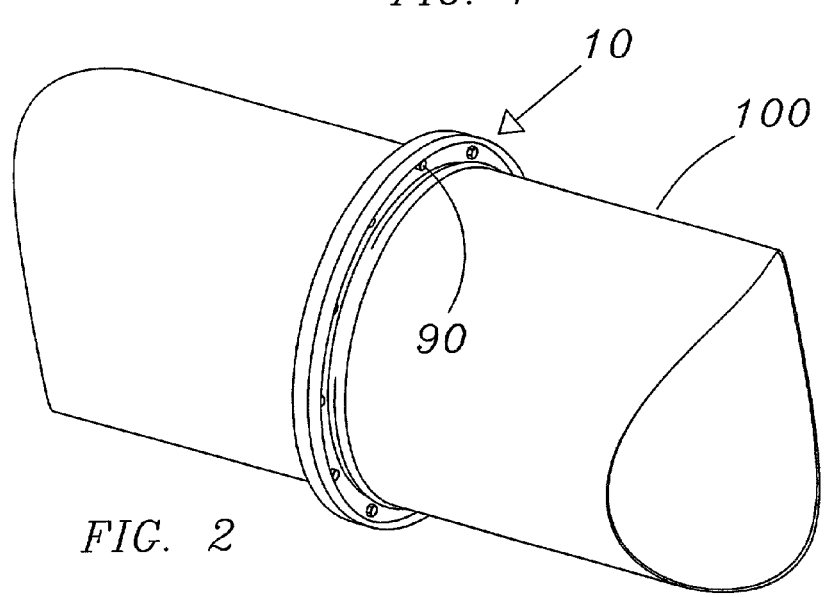
FIG. 2 is a perspective view of a second version of the apparatus for connecting and sealing duct sections adapted for use with a round duct.
Figure 3:
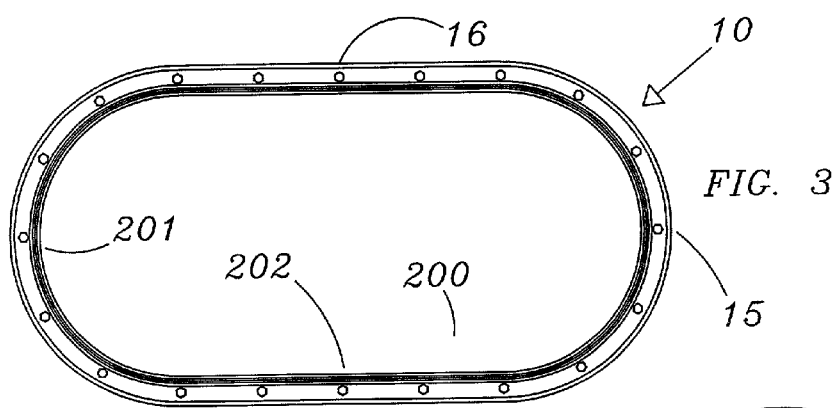
FIG. 3 is an isometric view of the version of the apparatus for connecting and sealing duct sections of FIG. 1.
Figure 4:
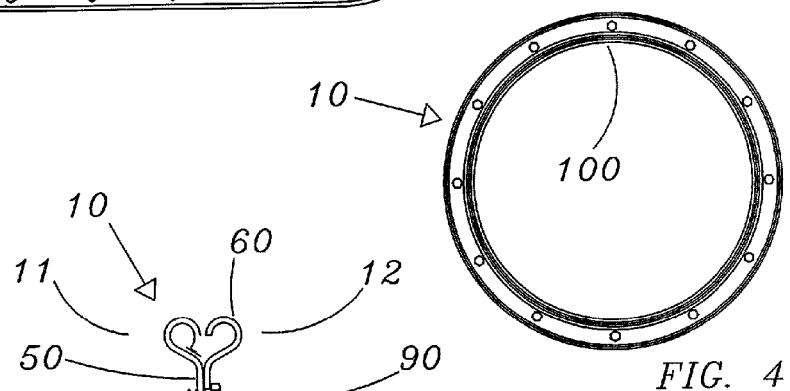
FIG. 4 is an isometric view of the version of the apparatus for connecting and sealing duct sections of FIG. 2.

Referring particularly to FIGS. 5 and 6, the fastening structure between the first and second connectors may be understood. The outer surfaces 53 of the first and second annular flanges 50 associated with first and second connectors are positioned against each other. As seen in FIGS. 3 and 4, a plurality of fasteners 90, pass through holes defined in the flanges and connect the flanges 50 together. The number of fasteners is variable, but should be selected to prevent separation of the adjacent outer annular surfaces 53.

As seen in FIGS. 6B–6E, a preferred fastener is the sheet metal screw 93, due to its economical purchase and installation costs. A more costly option is the bolt/nut pairs 91, 92, illustrated in FIG. 6A. Use of such a fastener is particularly indicated where vibration may result in the loosening of sheet metal screws over time.

In some applications, a gasket 70 is positioned between the outer surfaces. The gasket is illustrated in FIGS. 6B, 6D and 6E, and may be made of any of a variety of commercially available materials. A first side surface 71 of the gasket is carried against the outer annular surface 53 of the first connector, while the second surface 72 is carried against the outer annular surface of the second connector.

In some applications, duct sealer 80 may be used instead of, or in addition to, the gasket. As seen in FIG. 6C, duct sealer can be used without a gasket 70; alternatively, as seen in FIG. 6D, duct sealer can be used with a gasket. A preferred duct sealer is a caulk-like material, and is placed between the outer surfaces 53 of the flanges of the first and second connectors prior to the attachment of the fasteners 90. After attachment, a portion 81 of the duct sealer remains between the flanges. However, as the fasteners are tightened, excess duct sealer 82 may be squeezed from between the flanges when the two outer annular surfaces 53 of the two respective connectors are pressed together. In this circumstance, an excess duct sealer trough 65, defined between the rolled edges 60 of two adjacent connectors 11, 12, of the apparatus 10, provides a location to which excess duct sealer is discharged. As a result of the excess duct sealer containment trough 65, duct sealer does not foul the round perimeter 63. In some circumstances a portion 83 of the duct sealer may enter the duct, but is of no consequence.

Two ducts may be joined in the following manner. A connector is attached to each duct. The tubular member 20 is incrementally smaller in diameter than the duct to which it is attached. The O-ring 40 makes a generally airtight seal with the duct. A gasket 70 may be put between the outer annular surfaces 53 of the respective connectors. Duct sealer 80 may be put over both surfaces 71, 72 of the gasket. The fasteners 90 are tightened, causing excess duct sealer 82 to move into the excess duct sealer containment trough 65, thereby preventing fouling of the perimeter 63.

The previously described versions of the present invention have many advantages, including a primary advantage of providing a novel apparatus for connecting and sealing duct sections wherein a rolled edge defined on the outer edge of a radially directed flange which results in a rigid flange having a planar surface which is not easily deformed, and which results in a rounded perimeter which is unlikely to cut or injure.

Another advantage of the present invention is to provide a novel apparatus for connecting and sealing duct sections which includes a radially directed annular flange having a rolled edge defining a tube cavity which is adapted to carry a wire rod, which results in additional reinforcement of the flange.

A still further advantage of the present invention is to provide a novel apparatus for connecting and sealing duct sections, whereby when the outer annular surface of the radially directed annular flange of each of first and second connectors are brought into contact, an excess duct sealer containment trough is formed; and whereby when fasteners are attached to connect the annular flanges, the excess duct sealer carried between the annular flanges is transferred to the excess duct sealer containment trough in a manner that prevents the rounded perimeter from becoming fouled with duct sealer.

Although the present invention has been described in considerable detail and with reference to certain preferred versions, other versions are possible. For example, while a preferred version of the invention has been disclosed, slight variations in the shape of the rolled edge could result in the similar creation of an excess duct sealer containment trough. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An apparatus for connecting and sealing duct sections, the apparatus comprising:
   (A) first and second connectors, each connector comprising:
      (a) a tubular member;
      (b) an annular flange, extending radially outwardly from an outer end of the tubular member; and
      (c) a rolled edge, comprising:
         (i) an annular radially inner bend, attached to the outer perimeter of the annular flange;
         (ii) an annular radially outer roll, adjacent to the radially inner bend;
         (iii) an annular rounded perimeter, adjacent to the annular radially outer roll and at the outer perimeter of the annular flange, the annular rounded perimeter is rounded inwardly, toward the outer end of the tubular member;
         (iv) whereby a tube cavity is defined within the annular radially outer roll and annular rounded perimeter; and
         (v) a wire rod, carried within the tube cavity;
   (B) whereby an excess duct sealer trough is defined between rolled edges of the first and second connectors;
   (C) a gasket, carried between outer annular surfaces of the annular flanges of the first and second connectors, the gasket having a first side surface directed toward the outer annular surface of the first connector and a second side surface directed toward the outer annular surface of the second connector;

(D) a duct sealer, carried firstly between the first side surface of the gasket and the outer annular surface of the annular flange of the first connector, and carried secondly between the second side surface of the gasket and the outer annular surface of the annular flange of the second connector, and carried thirdly tamed in the excess duct sealer trough defined between the rolled edges of the first and second connectors; and (E) a plurality of fasteners connecting the annular flange of the first connector to the annular flange of the second connector.

2. An apparatus for connecting and sealing duct sections, the apparatus comprising:

(A) first and second connectors, each connector comprising:
  (a) a tubular member;
  (b) an annular flange, extending radially outwardly from an outer end of the tubular member; and
  (c) a rolled edge, comprising:
    (i) an annular radially inner bend, attached to the outer perimeter of the annular flange;
    (ii) an annular radially outer roll, adjacent to the radially inner bend;
    (iii) an annular rounded perimeter, adjacent to the annular radially outer roll and at the outer perimeter of the annular flange, the annular rounded perimeter is rounded inwardly, toward the outer end of the tubular member; and
    (iv) whereby a tube cavity is defined within the annular radially outer roll and annular rounded perimeter;

(B) whereby an excess duct sealer trough is defined between rolled edges of the first and second connectors; and (C) a plurality of fasteners connecting the annular flange of the first connector to the annular flange of the second connector; and (D) a wire rod, carried within the tube cavity.

3. An apparatus for connecting and sealing duct sections, the apparatus comprising:

(A) first and second connectors, each connector comprising:
  (a) a tubular member;
  (b) an annular flange, extending radially outwardly from an outer end of the tubular member; and
  (c) wherein a distal edge of said tubular member includes a rounded, rolled edge, comprising:
    (i) an annular radially inner bend, attached to the outer perimeter of the annular flange;
    (ii) an annular radially outer roll, adjacent to the radially inner bend;
    (iii) and wherein said rounded, rolled edge includes an annular rounded perimeter, adjacent to the annular radially outer roll and at the outer perimeter of the annular flange, the annular rounded perimeter is rounded inwardly, toward the outer end of the tubular member; and
    (iv) whereby a tube cavity is defined within the annular radially outer roll and annular rounded perimeter;

(B) whereby an excess duct sealer trough is defined between rolled edges of the first and second connectors; and (C) a plurality of fasteners connecting the annular flange of the first connector to the annular flange of the second connector.

4. The apparatus for connecting and sealing duct sections of claim 3, additionally comprising:

(A) a gasket, carried between outer annular surfaces of the annular flanges of the first and second connectors, the gasket having a first side surface directed toward the outer annular surface of the first connector and a second side surface directed toward the outer annular surface of the second connector.

5. The apparatus for connecting and sealing duct sections of claim 4, additionally comprising:

(A) a duct sealer, carried firstly between the first side surface of the gasket and the outer annular surface of the annular flange of the first connector, and carried secondly between the second side surface of the gasket and the outer annular surface of the annular flange of the second connector, and carried thirdly carried in the excess duct sealer trough defined between the rolled edges of the first and second connectors.

6. The apparatus for connecting and sealing duct sections of claim 3, additionally comprising:

(A) a duct sealer, carried firstly between the annular flange of the first connector and the annular flange of the second connector.

7. The apparatus for connecting and sealing duct sections of claim 3, additionally comprising:

(A) an O-ring channel defined on an outer surface of the tubular member, the O-ring channel for receiving an O-ring.

8. The apparatus for connecting and sealing duct sections of claim 3, additionally comprising:

(A) a wire rod, carried within the tube cavity.

* * * * *